United States Patent
Miyoshi

(10) Patent No.: US 9,199,375 B2
(45) Date of Patent: Dec. 1, 2015

(54) ROBOT, ROBOT HAND, AND METHOD FOR ADJUSTING HOLDING POSITION OF ROBOT HAND

(71) Applicant: Kabushiki Kaisha Yaskawa Denki, Kitakyushu-shi (JP)

(72) Inventor: Tetsuya Miyoshi, Kitakyushu (JP)

(73) Assignee: KABUSHIKI KAISHA YASKAWA DENKI, Kitakyushu-Shi (JP)

(*) Notice: Subject to any disclaimer, the term of this patent is extended or adjusted under 35 U.S.C. 154(b) by 116 days.

(21) Appl. No.: 13/726,615

(22) Filed: Dec. 26, 2012

(65) Prior Publication Data

US 2013/0190925 A1 Jul. 25, 2013

(30) Foreign Application Priority Data

Jan. 19, 2012 (JP) ................................. 2012-008824

(51) Int. Cl.
*G06F 19/00* (2011.01)
*B25J 9/16* (2006.01)
*B25J 15/00* (2006.01)
*B25J 15/06* (2006.01)

(52) U.S. Cl.
CPC ................ *B25J 9/1612* (2013.01); *B25J 15/00* (2013.01); *B25J 15/0052* (2013.01); *B25J 15/0616* (2013.01)

(58) Field of Classification Search
CPC combination set(s) only.
See application file for complete search history.

(56) References Cited

U.S. PATENT DOCUMENTS

| | | | | | |
|---|---|---|---|---|---|
| 4,484,120 | A | * | 11/1984 | Olex et al. ................. | 318/568.14 |
| 5,062,673 | A | * | 11/1991 | Mimura ........................ | 294/111 |
| 5,201,325 | A | * | 4/1993 | McEwen et al. ............. | 600/587 |
| 5,373,747 | A | * | 12/1994 | Ogawa et al. ............ | 73/862.581 |
| 5,447,403 | A | * | 9/1995 | Engler, Jr. ......................... | 414/4 |
| 5,501,498 | A | * | 3/1996 | Ulrich ........................... | 294/106 |
| 5,579,444 | A | * | 11/1996 | Dalziel et al. ................. | 700/259 |
| 5,591,385 | A | * | 1/1997 | Arai et al. ..................... | 264/40.6 |
| 5,617,515 | A | * | 4/1997 | MacLaren et al. ............ | 700/264 |
| 5,685,684 | A | * | 11/1997 | Kato et al. ..................... | 414/217 |
| 5,737,500 | A | * | 4/1998 | Seraji et al. ................... | 700/251 |
| 5,745,387 | A | * | 4/1998 | Corby et al. ....................... | 703/1 |
| 5,748,854 | A | * | 5/1998 | Watanabe et al. ............ | 700/258 |
| 5,762,390 | A | * | 6/1998 | Gosselin et al. .............. | 294/106 |
| 5,771,553 | A | * | 6/1998 | Sim et al. .................... | 29/407.09 |
| 5,782,401 | A | * | 7/1998 | Hinrichs ....................... | 228/102 |
| 5,845,050 | A | * | 12/1998 | Sekiguchi ....................... | 706/20 |
| 5,876,325 | A | * | 3/1999 | Mizuno et al. ................ | 600/102 |

(Continued)

FOREIGN PATENT DOCUMENTS

| | | |
|---|---|---|
| EP | 0919515 | 6/1999 |
| JP | 57-166690 U | 10/1982 |

(Continued)

OTHER PUBLICATIONS

Japanese Office Action for corresponding JP Application No. 2012-008824, Nov. 26, 2013.

(Continued)

*Primary Examiner* — Jonathan L Sample
(74) *Attorney, Agent, or Firm* — Mori & Ward, LLP

(57) ABSTRACT

A robot includes a robot hand, an arm unit, and a controller. The robot hand includes a movable portion. To the arm unit, the robot hand is mounted. The controller is configured to control the arm unit to move the movable portion of the robot hand so as to adjust a holding position of the robot hand relative to a to-be-held object.

20 Claims, 9 Drawing Sheets

(56) References Cited

U.S. PATENT DOCUMENTS

| | | | |
|---|---|---|---|
| 6,272,396 B1* | 8/2001 | Taitler | 700/245 |
| 6,418,823 B1* | 7/2002 | Taitler | 83/36 |
| 6,493,606 B2* | 12/2002 | Saijo et al. | 700/245 |
| 6,496,756 B1* | 12/2002 | Nishizawa et al. | 700/264 |
| 6,584,377 B2* | 6/2003 | Saijo et al. | 700/245 |
| 6,675,068 B1* | 1/2004 | Kawasaki | 700/245 |
| 6,681,031 B2* | 1/2004 | Cohen et al. | 382/103 |
| 6,996,456 B2* | 2/2006 | Cordell et al. | 700/258 |
| 7,313,464 B1* | 12/2007 | Perreault et al. | 700/245 |
| 7,474,939 B2* | 1/2009 | Oda et al. | 700/245 |
| 7,701,202 B2* | 4/2010 | Torres-Jara | 324/207.2 |
| 7,714,895 B2* | 5/2010 | Pretlove et al. | 348/211.2 |
| 7,843,425 B2* | 11/2010 | Lu et al. | 345/156 |
| 8,140,188 B2* | 3/2012 | Takemitsu et al. | 700/245 |
| 8,401,702 B2* | 3/2013 | Okazaki et al. | 700/260 |
| 8,408,619 B2* | 4/2013 | Murakami et al. | 294/119.1 |
| 8,781,629 B2* | 7/2014 | Ota | 700/259 |
| 2001/0002517 A1* | 6/2001 | Kato et al. | 34/406 |
| 2002/0045328 A1* | 4/2002 | Kobayashi | 438/471 |
| 2002/0061504 A1* | 5/2002 | Saijo et al. | 434/268 |
| 2003/0053902 A1* | 3/2003 | Yokota et al. | 414/744.2 |
| 2003/0146898 A1* | 8/2003 | Kawasaki et al. | 345/156 |
| 2004/0001750 A1* | 1/2004 | Kremerman | 414/744.1 |
| 2004/0078114 A1* | 4/2004 | Cordell et al. | 700/258 |
| 2004/0186624 A1* | 9/2004 | Oda et al. | 700/245 |
| 2004/0189675 A1* | 9/2004 | Pretlove et al. | 345/633 |
| 2005/0001842 A1* | 1/2005 | Park et al. | 345/474 |
| 2005/0218679 A1* | 10/2005 | Yokoyama et al. | 294/99.1 |
| 2005/0256611 A1* | 11/2005 | Pretlove et al. | 700/264 |
| 2006/0012197 A1* | 1/2006 | Anderson et al. | 294/106 |
| 2006/0253223 A1* | 11/2006 | Bodenheimer et al. | 700/245 |
| 2007/0018470 A1* | 1/2007 | Hayakawa et al. | 294/106 |
| 2007/0067678 A1* | 3/2007 | Hosek et al. | 714/25 |
| 2007/0260394 A1* | 11/2007 | Dean | 701/207 |
| 2007/0280006 A1* | 12/2007 | Aoyama et al. | 365/189.01 |
| 2008/0027582 A1* | 1/2008 | Obinata et al. | 700/260 |
| 2008/0167662 A1* | 7/2008 | Kurtz | 606/130 |
| 2009/0076657 A1* | 3/2009 | Tsuboi et al. | 700/275 |
| 2009/0132088 A1* | 5/2009 | Taitler | 700/264 |
| 2009/0210090 A1* | 8/2009 | Takemitsu et al. | 700/245 |
| 2011/0015785 A1* | 1/2011 | Tsusaka et al. | 700/254 |
| 2011/0015787 A1* | 1/2011 | Tsusaka | 700/264 |
| 2011/0029133 A1* | 2/2011 | Okazaki et al. | 700/258 |
| 2011/0067504 A1* | 3/2011 | Koyama et al. | 73/862.381 |
| 2011/0254303 A1* | 10/2011 | Doh et al. | 294/213 |
| 2012/0175904 A1* | 7/2012 | Murakami et al. | 294/213 |
| 2012/0223199 A1* | 9/2012 | Abri et al. | 248/280.11 |
| 2013/0184866 A1* | 7/2013 | Ota et al. | 700/250 |
| 2013/0184870 A1* | 7/2013 | Ota et al. | 700/262 |
| 2013/0245823 A1* | 9/2013 | Kimura et al. | 700/248 |

FOREIGN PATENT DOCUMENTS

| | | |
|---|---|---|
| JP | 58-203011 | 11/1983 |
| JP | 61-157551 U | 9/1986 |
| JP | 05-002892 U | 1/1993 |
| JP | 07-124881 | 5/1995 |
| JP | 11-216752 | 8/1999 |
| JP | 2000-167791 | 6/2000 |
| JP | 2000-176873 | 6/2000 |
| JP | 2002-283263 | 10/2002 |
| JP | 2003-048184 | 2/2003 |

OTHER PUBLICATIONS

Chinese Office Action for corresponding CN Application No. 201310026195.2, Nov. 4, 2014.

Extended European Search Report for corresponding EP Application No. 12196879.6-1712, Jul. 28, 2014.

\* cited by examiner

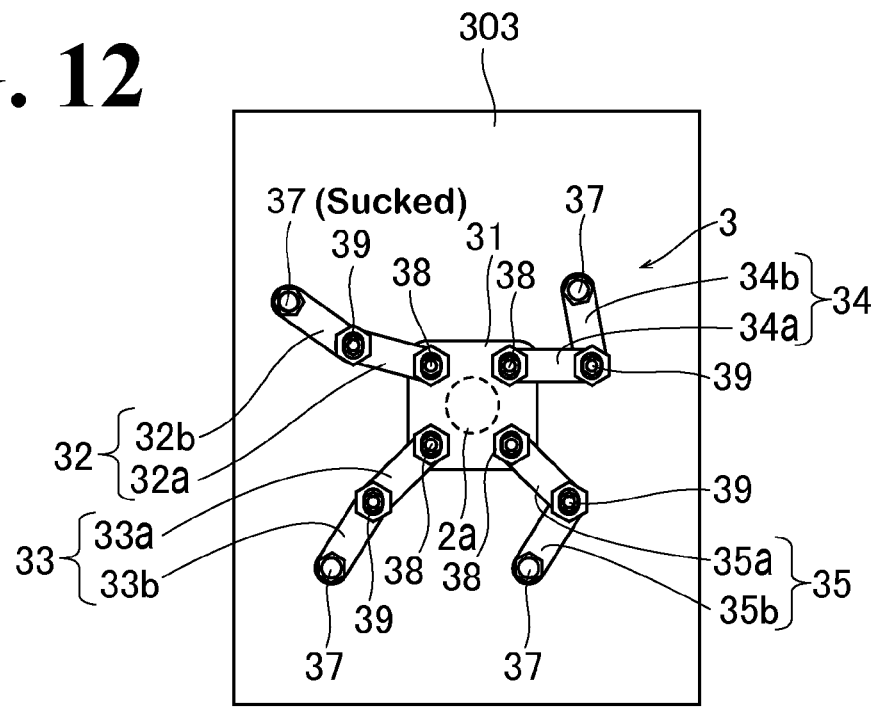
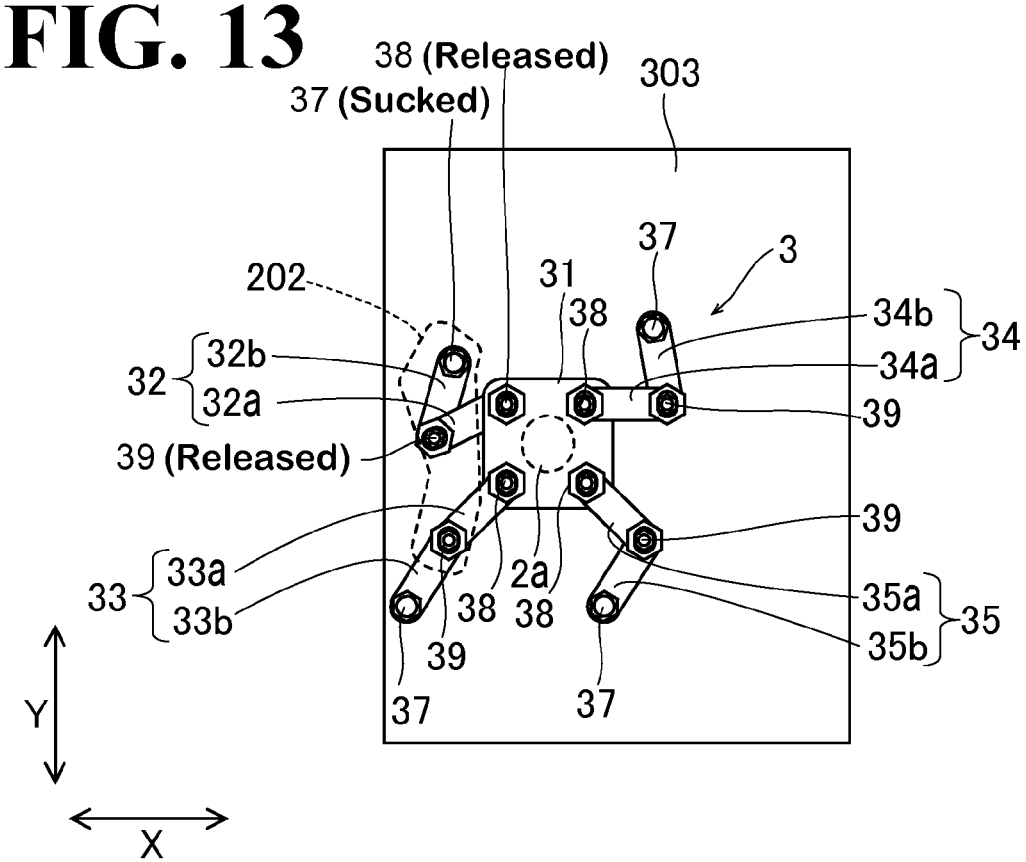

ROBOT, ROBOT HAND, AND METHOD FOR ADJUSTING HOLDING POSITION OF ROBOT HAND

CROSS-REFERENCE TO RELATED APPLICATIONS

The present application claims priority under 35 U.S.C. §119 to Japanese Patent Application No. 2012-008824, filed Jan. 19, 2012. The contents of this application are incorporated herein by reference in their entirety.

BACKGROUND OF THE INVENTION

1. Field of the Invention

The present invention relates to a robot, a robot hand, and a method for adjusting a holding position of a robot hand.

2. Discussion of the Background

Robots and robot hands hold to-be-held objects (see, for example, Japanese Unexamined Patent Application Publication No. 11-216752).

Japanese Unexamined Patent Application Publication No. 11-216752 discloses a robot that includes a robot hand mounted on an arm unit, and a plurality of suction devices mounted on the robot hand to hold a container (to-be-held object). The robot of Japanese Unexamined Patent Application Publication No. 11-216752 has its plurality of suction devices hold the container, which is molded in an injection molding machine, by suction of suckers disposed at the distal ends of the suction devices. The plurality of suction devices are presumably mounted on the robot hand in a fixed manner.

SUMMARY OF THE INVENTION

According to one aspect of the present invention, a robot includes a robot hand, an arm unit, and a controller. The robot hand includes a movable portion. To the arm unit, the robot hand is mounted. The controller is configured to control the arm unit to move the movable portion of the robot hand so as to adjust a holding position of the robot hand relative to a to-be-held object.

According to another aspect of the present invention, a robot hand mountable to a robot includes a base, a movable portion, a holder, and a lock. The base is mountable to the robot. The movable portion is supported by the base. The holder is disposed on the movable portion and configured to hold an object. The lock is configured to fix the movable portion and release the movable portion out of fixed state. The lock is configured to, at a command from a control device, release the movable portion out of fixed state at least partially while the holder is in a holding operation so as to permit the movable portion to move by movement of the robot and to change a form of the movable portion. The lock is then configured to fix the released movable portion.

According to the other aspect of the present invention, a method for adjusting a holding position of a robot hand the method includes fixing a part of the robot hand. An arm unit to which the robot hand is mounted is moved with the part of the robot hand in fixed state so as to move a movable portion of the robot hand and adjust a holding position of the robot hand relative to a to-be-held object.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 12 is a diagram illustrating a state before the adjustment of the holding position, relative to the workpiece, of the robot hand of the robot according to the first embodiment of the present invention;

FIG. 13 is a diagram illustrating a state after the adjustment of the holding position, relative to the workpiece, of the robot hand of the robot according to the first embodiment of the present invention;

DESCRIPTION OF THE EMBODIMENTS

Figure 1:
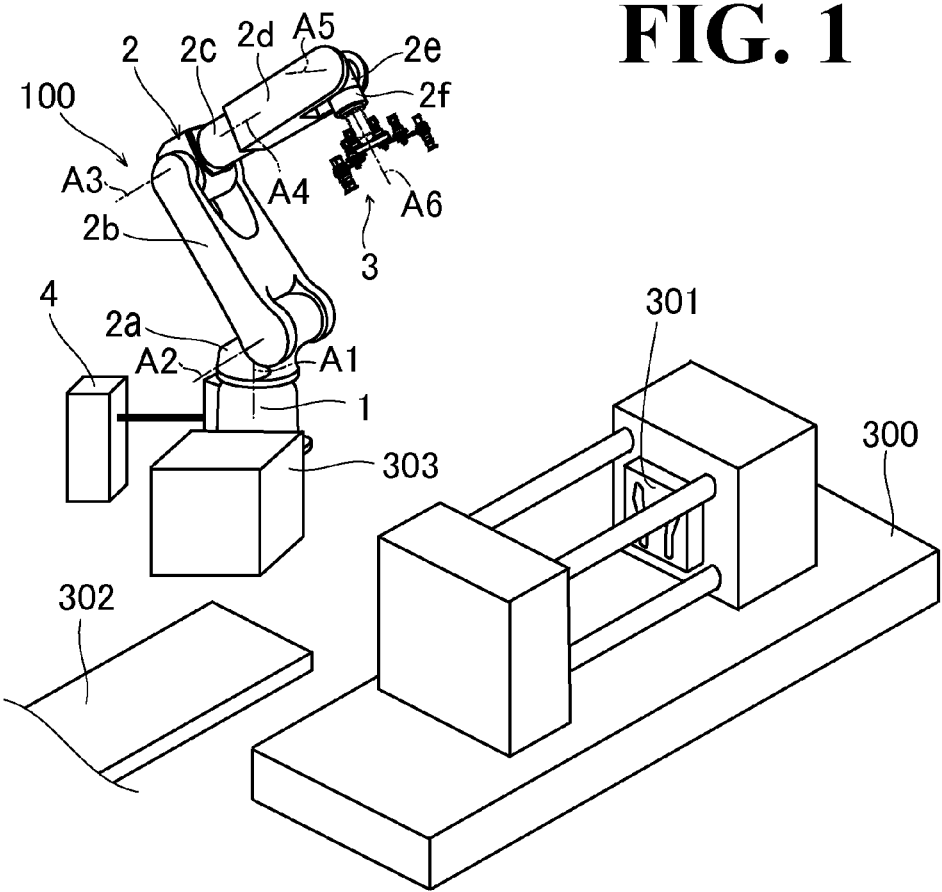
FIG. 1 is a perspective view of a robot according to a first embodiment of the present invention and of an injection molding machine.

The embodiments will now be described with reference to the accompanying drawings, wherein like reference numerals designate corresponding or identical elements throughout the various drawings.

First Embodiment

A configuration of a robot 100 according to the first embodiment will be described by referring to FIGS. 1 to 9.

As shown in FIG. 1, the robot 100 includes a robot main body 2, a robot hand 3 disposed at a distal end of the robot main body 2, and a robot controller 4 that controls overall operation of the robot 100. Adjacent the robot 100 are disposed an injection molding machine 300 including a mold 301 in which to mold a workpiece 200, and a conveyor 302 that conveys the workpiece 200, which is now a resin product molded in the injection molding machine 300. Also adjacent the robot 100, a table 303 is disposed for adjusting a holding (suction) position of a suction device 37, described later, of the robot hand 3 relative to a workpiece 200. The workpiece 200 is an exemplary "to-be-held object" recited in the accompanying claims.

Figure 2:
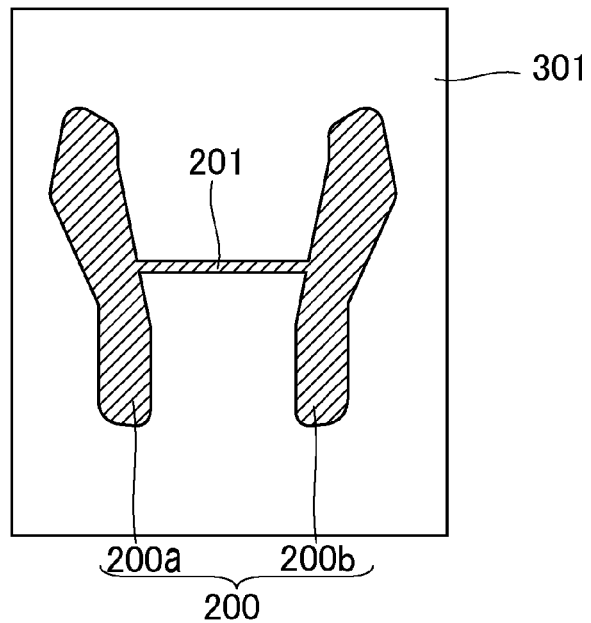
FIG. 2 is a front view of a workpiece to be held by the robot according to the first embodiment of the present invention, illustrating a state of the workpiece disposed in a mold before being held.

As shown in FIG. 2, the workpiece 200 is resin-molded in the mold 301 of the injection molding machine 300. The workpiece 200 is made up of a plurality of (two in the first embodiment) resin products 200a and 200b coupled to one another through a connecting portion (sprue and/or runner, in the embodiment) 201.

As shown in FIG. 1, the robot main body 2 includes a base 1 and arm units 2a to 2f. The base 1 is fixed to the installation surface, and the arm unit 2a is coupled to the base 1 rotatably about a rotation axis A1. The arm unit 2b is coupled to the arm unit 2a rotatably about a rotation axis A2, which is approximately perpendicular to the rotation axis A1. The arm unit 2c is coupled to the arm unit 2b rotatably about a rotation axis A3, which is approximately parallel to the rotation axis A2. The arm unit 2d is coupled to the arm unit 2c rotatably about a rotation axis A4, which is approximately perpendicular to the rotation axis A3. The arm unit 2e is coupled to the arm unit 2d rotatably about a rotation axis A5, which is approximately perpendicular to the rotation axis A4. The arm unit 2f is coupled to the arm unit 2e rotatably about a rotation axis A6, which is approximately perpendicular to the rotation axis A5. The arm units 2a to 2f are provided therein with actuators (not shown), each with a servo motor and a reducer, corresponding to the respective rotation axes A1 to A6. Each servo motor is coupled to the robot controller 4 to be operation-controlled in accordance with an operation command from the robot controller 4.

The robot hand 3 is mounted on the most distal arm unit 2f and holds a workpiece 200 by suction. As shown in FIGS. 3 to 6, the robot hand 3 includes a base 31 and four links 32, 33, 34, and 35 mounted on the base 31. A flange 36 is disposed on a surface of the base 31, and the arm unit 2f and the flange 36 are coupled to one another. Each of the links 32, 33, 34, and 35 is an exemplary "movable portion" recited in the accompanying claims. Also, the links 32, 33, 34, and 35 are respectively exemplary "first link", "second link", "third link", and "fourth link" recited in the accompanying claims.

Here, in the first embodiment, the link 32 and the link 33 are disposed on one side of the base 31, to which the arm unit 2f is mounted, while the link 34 and the link 35 are disposed on the other side of the base 31. At a distal end of each of the links 32, 33, 34, and 35, a suction device 37 is mounted to hold (by suction) a workpiece 200. At a distal end of the suction device 37, a suction pad 37a (see FIGS. 4 and 5) is disposed. When the air pressure inside the suction pad 37a is turned into negative, the suction pad 37a sucks the workpiece 200. The suction devices 37 of the links 32 and 33 hold (by suction) the resin product 200a, which is one of the two resin products 200a and 200b coupled to one another through the connecting portion 201, while the suction devices 37 of the links 34 and 35 hold (by suction) the other resin product 200b. The suction device 37 is an exemplary "holder" recited in the accompanying claims. The workpiece 200 (including the resin products 200a and 200b) is an exemplary "to-be-held object" recited in the accompanying claims.

Also in the first embodiment, the arm units 2a to 2f are moved with one suction device 37 at one of the four links 32 to 35 (among the suction devices 37) in fixed state so as to move the links 32 to 35 and adjust the holding positions (sucking positions) of the suction devices 37 relative to the workpiece 200 (resin products 200a and 200b).

Figure 3:
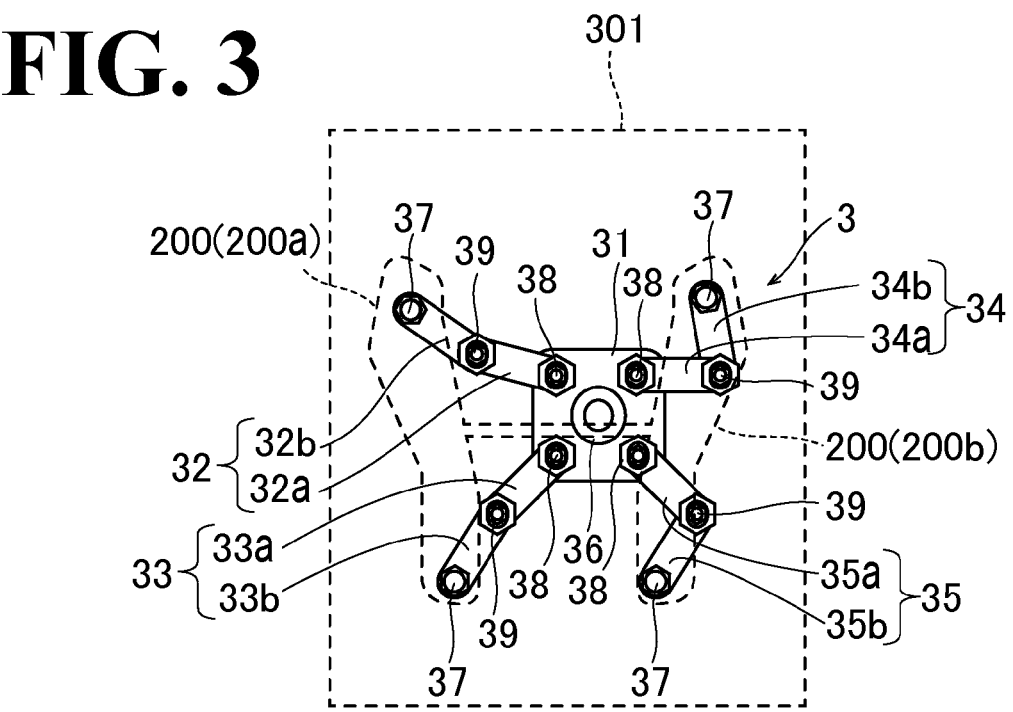
FIG. 3 is a top view, from the robot arm side, of a robot hand of the robot according to the first embodiment of the present invention.
Figure 4:
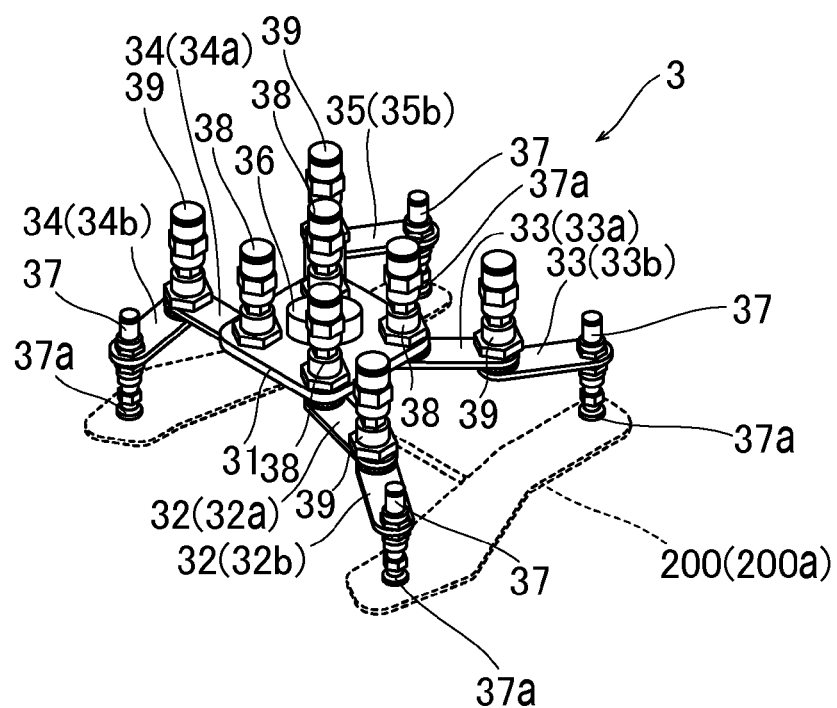
FIG. 4 is a perspective view of the robot hand of the robot according to the first embodiment of the present invention.
Figure 5:
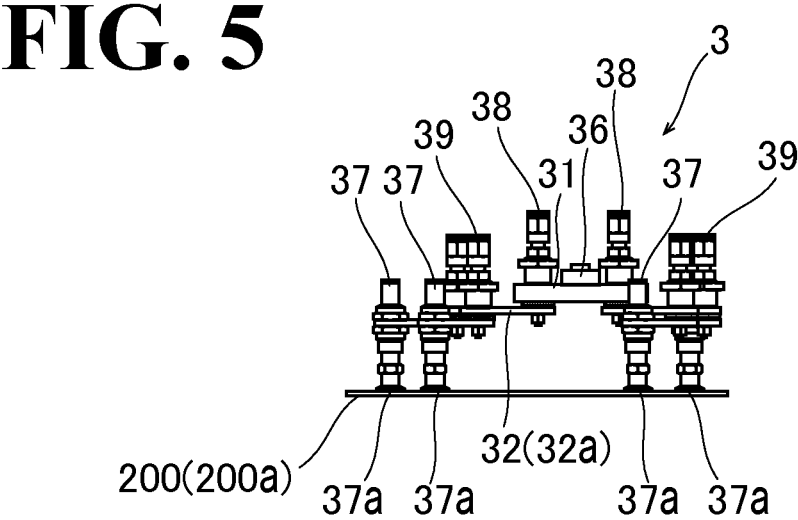
FIG. 5 is a side view of the robot hand of the robot according to the first embodiment of the present invention.
Figure 6:
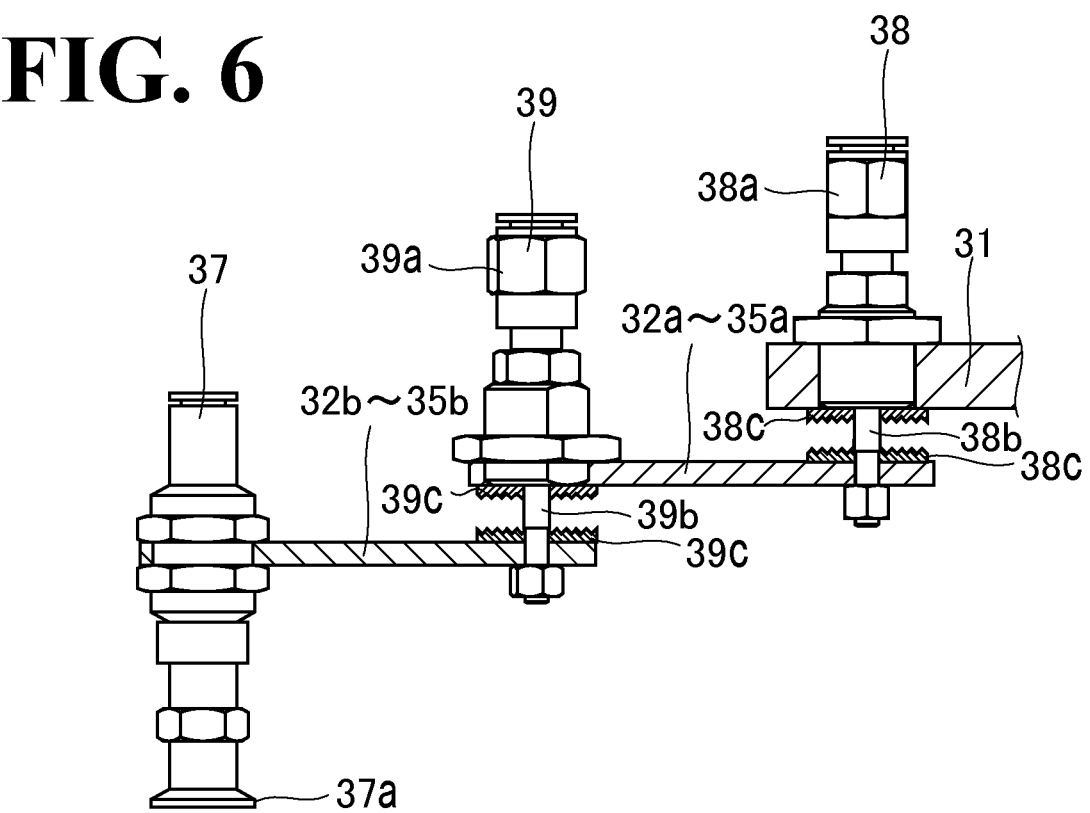
FIG. 6 is a diagram illustrating a lock released state of a lock of the robot hand of the robot according to the first embodiment of the present invention.

As shown in FIGS. 3 to 5, the link 32 includes a link portion 32a disposed at the base 31 side and a link portion 32b disposed at the suction device 37 side. The link 33 includes a link portion 33a disposed at the base 31 side and a link portion 33b disposed at the suction device 37 side. The link 34 includes a link portion 34a disposed at the base 31 side and a link portion 34b disposed at the suction device 37 side. The link 35 includes a link portion 35a disposed at the base 31 side and a link portion 35b disposed at the suction device 37 side. A lock 38 is disposed at the connection between the base 31 and each of the link portions 32a to 35a respectively of the links 32 to 35. As shown in FIG. 6, the lock 38 includes an air cylinder 38a, a shaft 38b, and a pair of latches 38c. The base 31 and each of the link portions 32a to 35a respectively of the four links 32 to 35 are coupled to one another through the shaft 38b of the lock 38. The pair of latches 38c are opposed to one another, and each's opposed surface is in the form of teeth.

Figure 7:
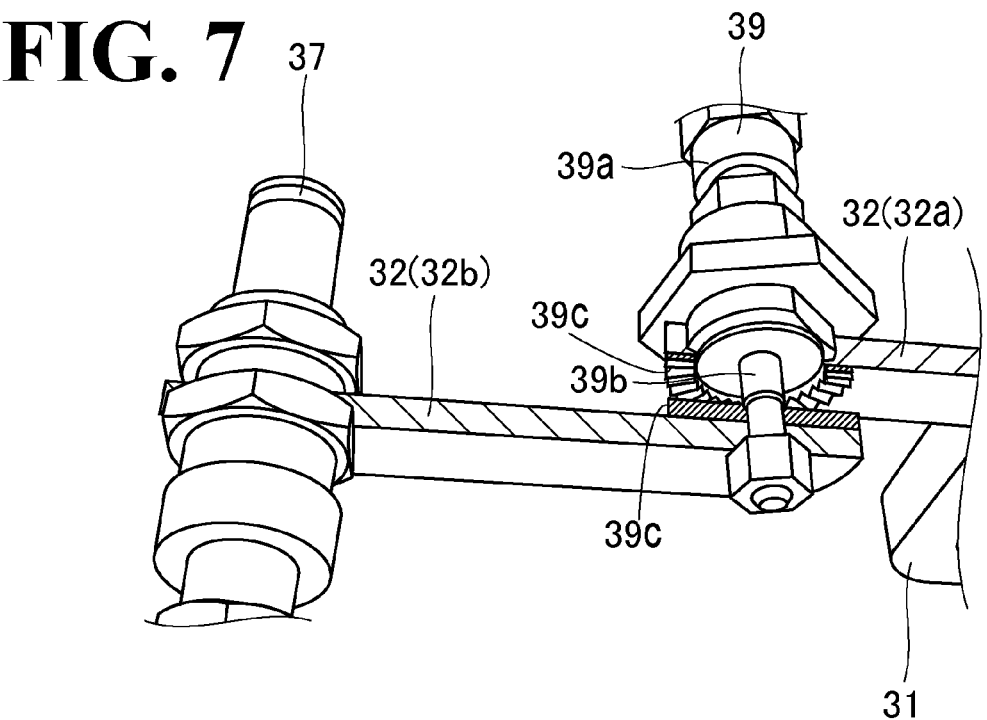
FIG. 7 is a cross-sectional view of the lock of the robot hand of the robot according to the first embodiment of the present invention.
Figure 8:
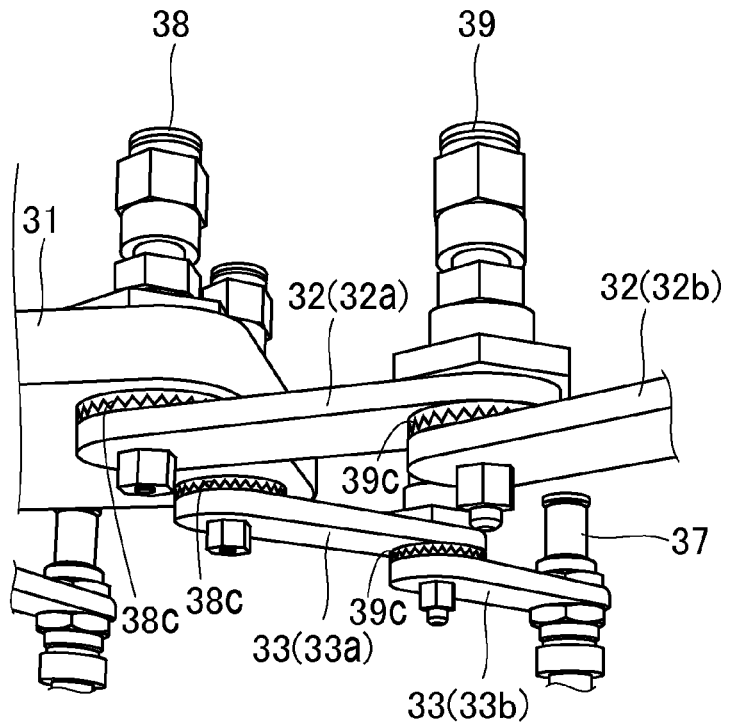
FIG. 8 is a lower perspective view of the robot hand of the robot according to the first embodiment of the present invention.

As shown in FIGS. 6 and 7, a lock 39 is disposed at the connection between the link portion 32a (33a, 34a, 35a) and the link portion 32b (33b, 34b, 35b) of the link 32 (33, 34, 35). The lock 39 includes an air cylinder 39a, a shaft 39b, and a pair of latches 39c. The link portion 32a (33a, 34a, 35a) and the link portion 32b (33b, 34b, 35b) are coupled to one another through the shaft 39b of the lock 39. The pair of latches 39c are opposed to one another, and each's opposed surface is in the form of teeth.

In the first embodiment, the lock 38 and the lock 39 release the links 32 to 35 out of locked state so as to permit the links 32 to 35 to move and adjust the holding position of the robot hand 3 relative to the workpiece 200. Specifically, in the normal operation of the robot hand 3 holding the workpiece 200, biasing force of a spring (not shown) turns the teeth of the pair of latches 38c (the pair of latches 39c) into meshed state (see FIG. 8). This effects a locked state between the base 31 and each of the link portions 32a, 33a, 34a, and 35a (and respectively between the link portions 32a, 33a, 34a, and 35a and the link portions 32b, 33b, 34b, and 35b). When changes occur to the size and shape of the workpiece 200 to be held, in order to move the links 32 to 35 and adjust the holding position of the robot hand 3 relative to the workpiece 200, air is injected into the air cylinder 38a of the lock 38 (the air cylinder 39a of the lock 39) to turn the teeth of the pair of latches 38c (the pair of latches 39c) into separated state (see FIG. 6) against the biasing force of the spring (not shown). This effects a movable state between the base 31 and each of the link portions 32a, 33a, 34a, and 35a (and respectively between the link portions 32a, 33a, 34a, and 35a and the link portions 32b, 33b, 34b, and 35b).

Figure 9:
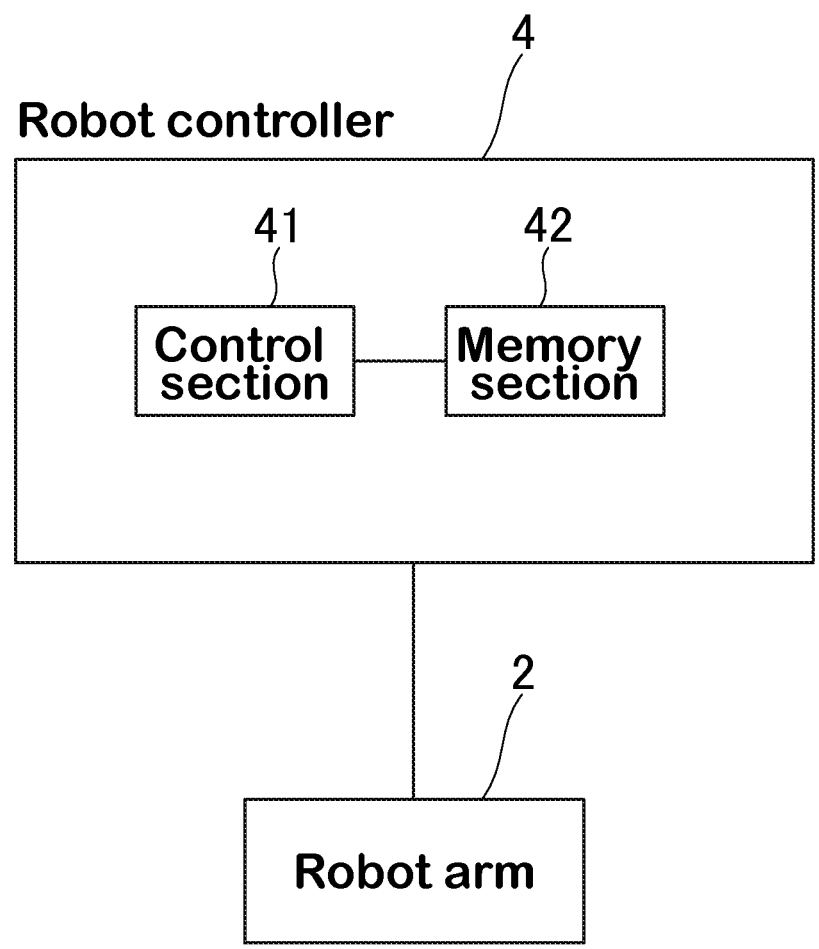
FIG. 9 is a block diagram of the robot according to the first embodiment of the present invention.

As shown in FIG. 9, the robot controller 4 includes a control section 41 and a memory section 42. The memory section 42 stores movements of the robot 100 taught in advance. In the first embodiment, the control section 41 controls the suction device 37 to be fixed to a surface of the table 303 (see FIG. 1), and moves the arm units 4a to 4c based on holding position information of the workpiece 200 (such as coordinates of the position at which to hold the workpiece 200) with the suction device 37 of the robot hand 3 fixed to the table 303 so as to move the links 32 to 35 and adjust the holding position of the robot hand 3 at which to hold the workpiece 200. Specifically, at a command from the control section 41, the locks 38 and 39 release at least one of the links 32 to 35 out of fixed state while the suction device 37 is in its holding operation so as to permit the at least one of the links 32 to 35 to move by movement of the robot 100 and to change the form of the at least one of the links 32 to 35. Then, the locks 38 and 39 fix the released links 32 to 35. In the first embodiment, the holding position information of the workpiece 200 (coordinates of the position at which to hold the workpiece 200) corresponds to the shape of the workpiece 200 and is input and stored in the memory section 42 in advance. The control section 41 controls one of the links 32 to 35 to move while keeping the corresponding suction device 37 fixed to the surface of the table 303 so as to adjust the holding position of the suction device 37 of the one of the four links 32 to 35, and sequentially performs this control with respect to the remaining links, one link at a time, among the four links 32 to 35. The control section 41 is an exemplary "control device" recited in the accompanying claims.

Next, description will be made with regard to an operation of the control section 41 at the time of adjusting the holding position of the robot hand 3 of the robot 100 according to the first embodiment by referring to FIGS. 10 to 13.

Figure 10:
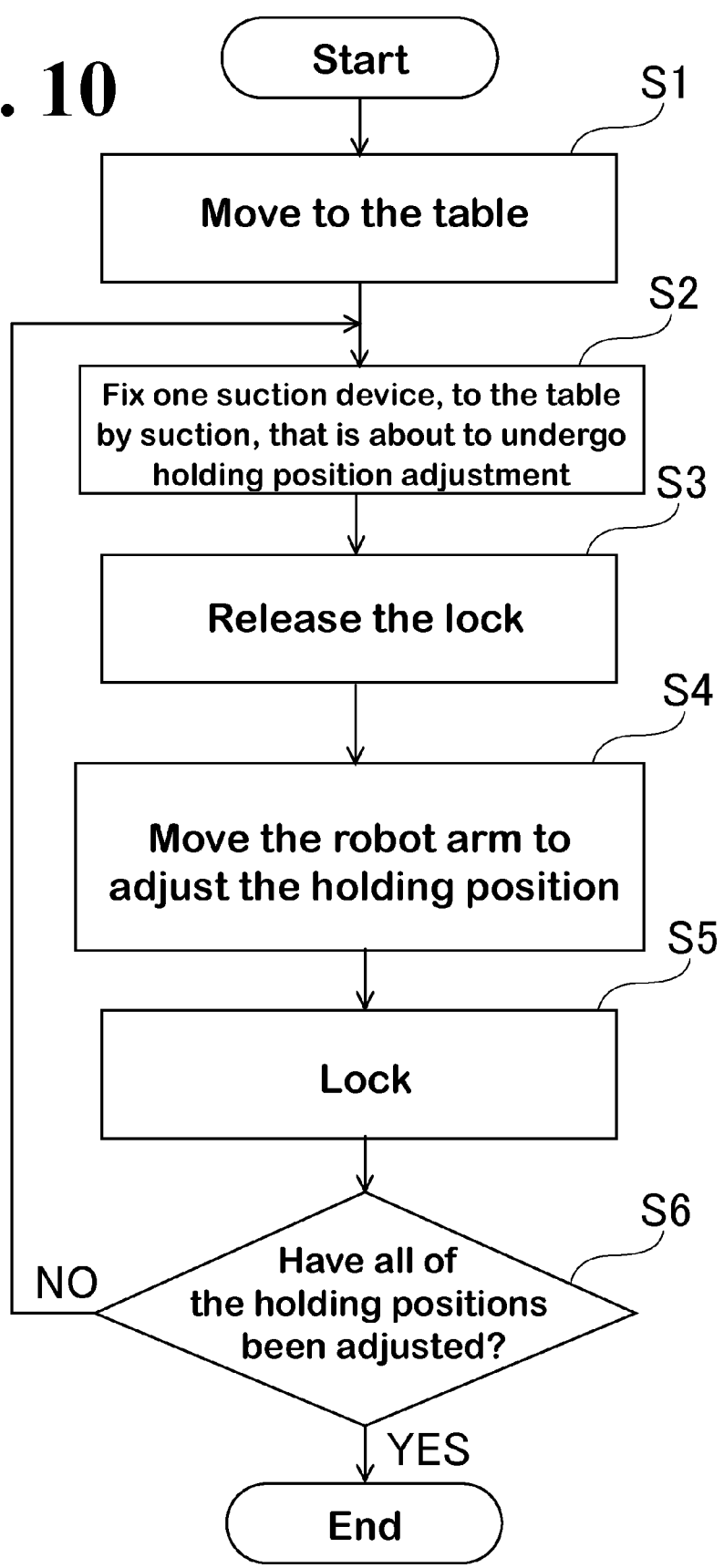
FIG. 10 is a flowchart illustrating an operation of adjusting a holding position, relative to the workpiece, of the robot hand of the robot according to the first embodiment of the present invention.
Figure 11:
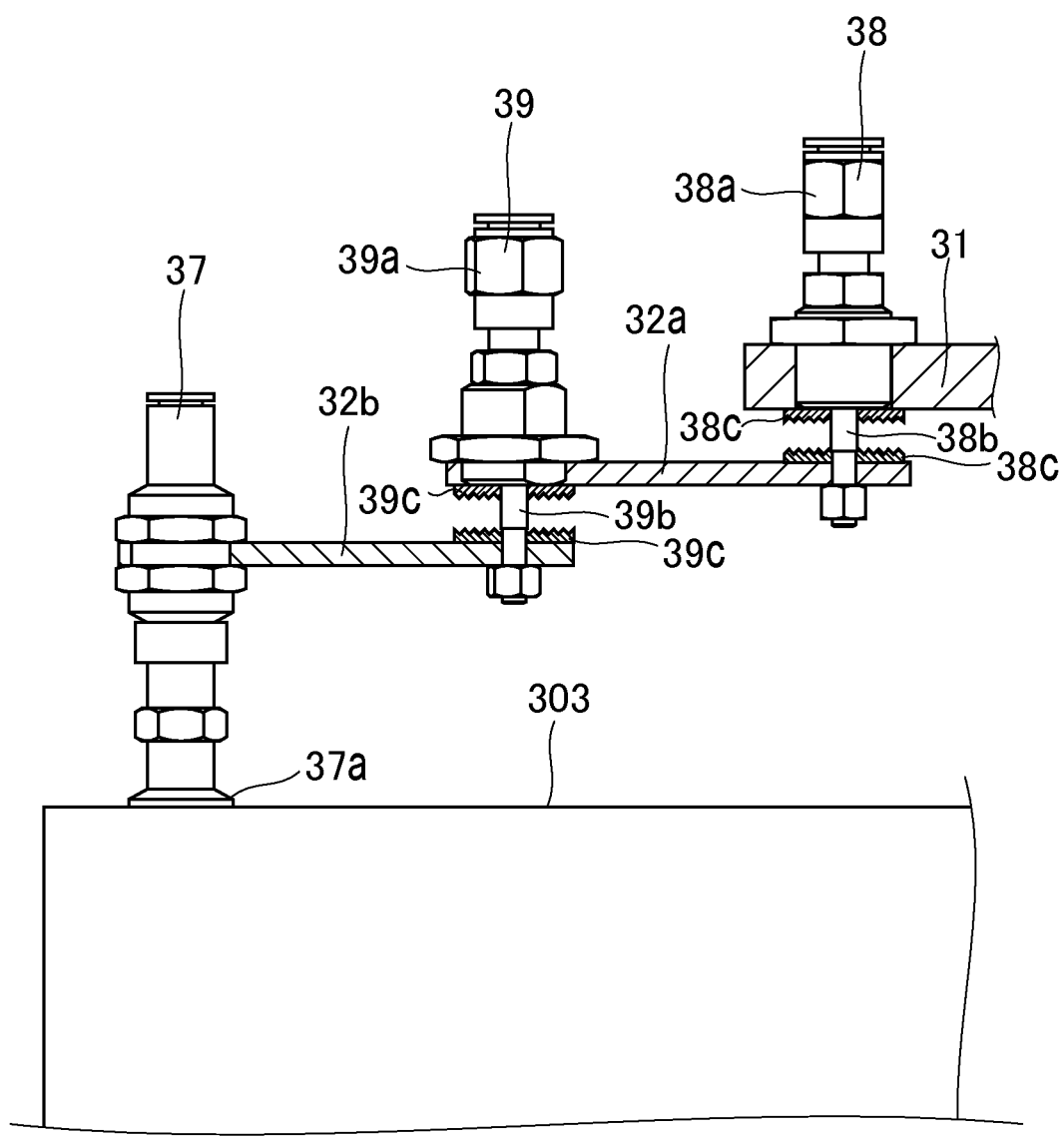
FIG. 11 is a diagram illustrating a state in which a suction device of the robot hand of the robot according to the first embodiment of the present invention is fixed to a table by suction.

Referring to the flowchart of FIG. 10, at step S1, the control section 41 moves the arm units 4a to 4c so as to move the robot hand 3 of the robot 100 to the table 303. Next, at step S2, the suction device 37 of one link (the link 32 in this example), among the links 32 to 35, that is about to undergo holding position adjustment is fixed to the table 303 by suction, as shown in FIG. 11.

Next, at step S3, the lock 38 disposed at the connection between the base 31 and the link portion 32a of the robot hand 3 is released out of locked state. Also, the lock 39 disposed at the connection between the link portion 32a and the link portion 32b of the link 32 is released out of locked state. This turns the connections between the base 31 and the link portion 32a and between the link portion 32a and the link portion 32b into movable state. It is noted that at the other links than the link 32, namely the links 33, 34, and 35, the lock 38 and the lock 39 remain in locked state.

Next, at step S4, based on the holding position information of the workpiece 200 input in advance, the arm units 2a to 2f are moved, for example, in the X direction and the Y direction shown in FIG. 13 so as to move the link 32 and adjust the holding position of the robot hand 3 at which to hold the workpiece 200. In FIG. 13, the suction device 37 holds (by suction) a workpiece 202, which is smaller than the workpiece 200 shown in FIG. 2, and for this purpose, the link 32 is moved to adjust the holding position of the suction device 37 of the link 32 relative to the workpiece 202. Then, at step S5, the lock 38, which couples the base 31 and the link portion 32a to one another, is turned into locked state. Also, the lock 39, which couples the link portion 32a and the link portion 32b to one another, is turned into locked state. The workpiece 202 is an exemplary "to-be-held object" recited in the accompanying claims.

Next, at step S6, a determination is made as to whether the holding positions of all of the four links 32 to 35 at which to hold the workpiece 200 have been adjusted. When the determination indicates that not all of the holding positions of the four links 32 to 35 at which to hold the workpiece 200 have been adjusted, the process returns to step S2, where the holding position adjustment is sequentially performed with respect to the links (the links 33 to 35, in this example), one link at a time, whose holding positions at which to hold the workpiece 200 have not been adjusted yet. When at step S6 the determination indicates that all of the holding positions of the four links 32 to 35 at which to hold the workpiece 200 have been adjusted, the operation of adjusting the holding position of the robot hand 3 ends.

In the first embodiment, the arm units 2a to 2f are used to move the links 32 to 35 of the robot hand 3 and adjust the holding position of the robot hand 3 relative to the workpiece 200, as described above. Thus, the holding position of the robot hand 3 relative to the workpiece 200 is adjusted, and this eliminates the need for replacing the robot hand 3 when changes occur to the size and shape of the workpiece 200 and ensures reliable holding of the workpiece 200.

Also in the first embodiment, the robot hand 3 includes the suction device 37 mounted to each of the links 32 to 35 to hold the workpiece 200, and moves the arm units 2a to 2f with the suction device 37 in fixed state so as to move the links 32 to 35 and adjust the holding position of the suction device 37, as described above. Thus, the holding position of the suction device 37 relative to the workpiece 200 is adjusted, and this ensures that the suction device 37 reliably holds the workpiece 200 even when changes occur to the size and shape of the workpiece 200 to be held.

Also in the first embodiment, the arm units 2a to 2f are moved with one suction device 37 among the plurality of (four) suction devices 37 in fixed state so as to move the links 32 to 35 and adjust the holding position of the suction device 37 relative to the workpiece 200, as described above. Thus, the holding position of the suction device 37 relative to the workpiece 200 is adjusted with a simple configuration and without providing an additional, dedicated driving device to move the links 32 to 35 and the suction device 37.

Also in the first embodiment, the arm units 2a to 2f are moved so as to move the links 32 to 35 of the robot hand 3 and adjust the holding positions of the plurality of suction devices 37 at which to hold the workpiece 200 made up of a plurality of (two) resin products 200a and 200b, which are coupled to one another through the connecting portion 201, as described above. This ensures that the plurality of suction devices 37 reliably hold the workpiece 200 made up of the two resin products 200a and 200b, which are coupled to one another through the connecting portion 201.

Also in the first embodiment, the control section 41 is provided in order to control the arm units 2a to 2f to move. The control section 41 moves the arm units 2a to 2f based on the holding position information of the workpiece 200 with a part of the robot hand 3 in fixed state so as to move the links 32 to 35 and adjust the holding position of the robot hand 3 relative to the workpiece 200, as described above. Thus, the control section 41 automatically adjusts the holding position of the robot hand 3 relative to the workpiece 200.

Also in the first embodiment, the control section 41 controls the suction device 37 to be fixed and moves the arm units 2a to 2f based on the holding position information of the workpiece 200 with the suction device 37 in fixed state so as to move the links 32 to 35 and adjust the holding position of the suction device 37, as described above. This ensures that the control section 41 automatically performs the operation of fixing the suction device 37 and the operation of moving the links 32 to 35 to adjust the holding position of the suction device 37.

Also in the first embodiment, the control section 41 moves the links 32 to 35 while keeping the suction device 37 in fixed state so as to adjust the holding position of the suction device 37, and sequentially performs this control with respect to the plurality of other suction devices 37, one suction device at a time, as described above. This ensures that the control section 41 automatically performs the operation of adjusting the holding positions of all of the suction devices 37.

Also in the first embodiment, the link 32 and the link 33 are disposed on one side of the base 31, to which the arm unit 2f is mounted, while the link 34 and the link 35 are disposed on the other side of the base 31. To the distal end of each of the links 32 to 35, the suction device 37 is mounted to hold the workpiece 200, as described above. This ensures stable holding of the workpiece 200 made up of the two resin products 200a and 200b, which are coupled to one another through the connecting portion 201.

Also in the first embodiment, the locks 38 and 39 are mounted to the links 32 to 35 to lock the links 32 to 35, and the locks 38 and 39 release the links 32 to 35 out of locked state so as to permit the links 32 to 35 to move and adjust the holding position of the robot hand 3 relative to the workpiece 200, as described above. This ensures that the links 32 to 35 are locked by the locks 38 and 39 during other operations than the operation of adjusting the holding position of the robot hand 3 relative to the workpiece 200 (during the operation of holding the workpiece 200 by the robot hand 3). This inhibits shaky movement of the links 32 to 35 during the operation of holding the workpiece 200 by the robot hand 3.

Second Embodiment

Next, a robot hand 110 according to the second embodiment will be described by referring to FIGS. 14 and 15. The second embodiment is different from the first embodiment, where the robot hand 3 is provided with the links 32 to 35, in that the robot hand 110 is provided with linear motion guides 114 and 115.

Figure 14:
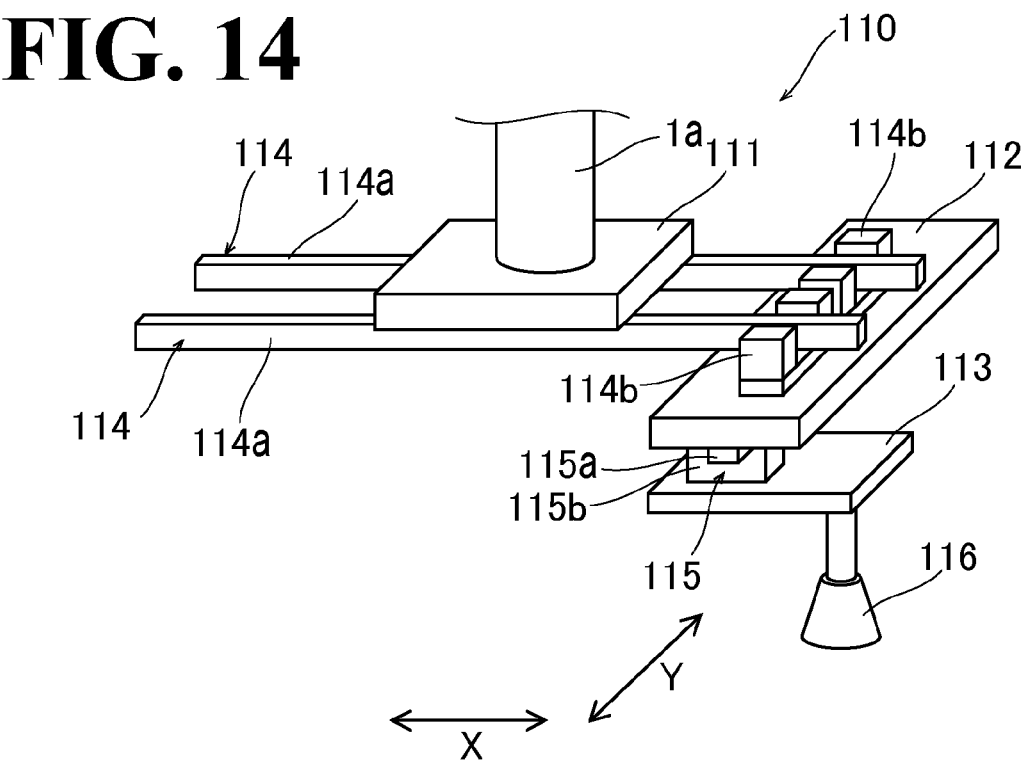
FIG. 14 is a perspective view of a robot hand of a robot according to a second embodiment of the present invention.
Figure 15:
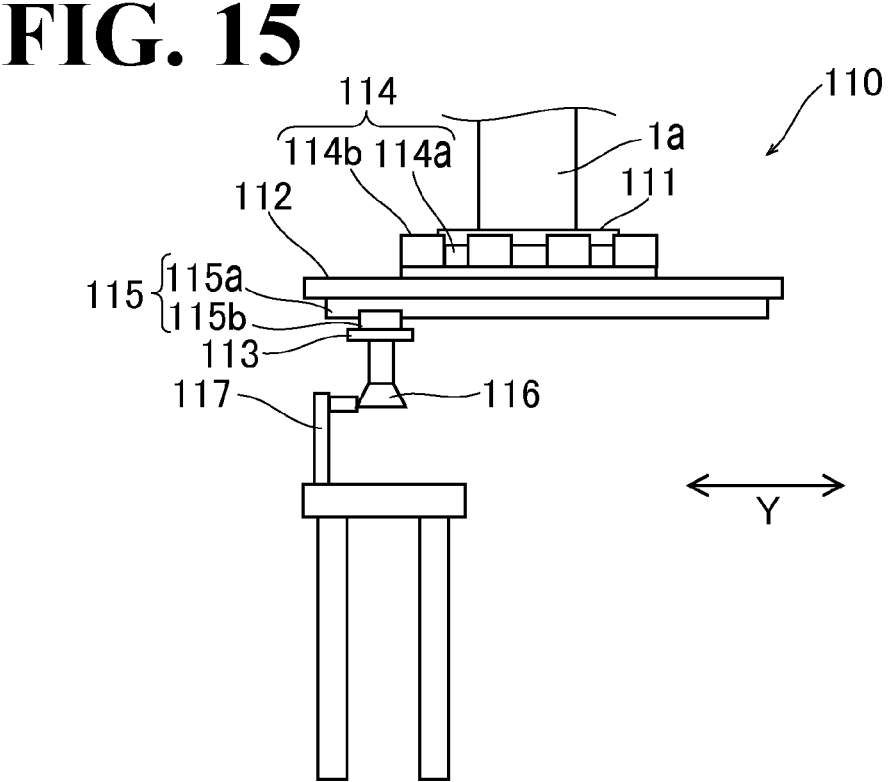
FIG. 15 is a side view of the robot hand of the robot according to the second embodiment of the present invention.

As shown in FIG. 14, the robot hand 110 according to the second embodiment includes bases 111, 112, and 113, two linear motion guides 114, a single linear motion guide 115, and a suction device 116. The linear motion guides 114 and 115 respectively include tracks 114a and 115a and slides 114b and 115b. The slide 114b (slide 115b) of the linear motion guide 114 (linear motion guide 115) is capable of locking the track 114a (track 115a). On an upper surface of the base 111, a robot arm (arm unit) 1a of the robot 100 is mounted. Between a lower surface of the base 111 and an upper surface of the base 112, the two linear motion guides 114 are disposed along the X direction. On a lower surface of the base 112, the single linear motion guide 115 is disposed along the Y direction. On a lower surface of the slide 115b of the linear motion guide 115, the suction device 116 is disposed through the base 113. Each of the slides 114b and 115b is an exemplary "movable portion" and exemplary "lock" recited in the accompanying claims. The suction device 116 is an exemplary "holder" recited in the accompanying claims.

To adjust the holding position of the robot hand 110 (suction device 116) relative to the workpiece 200, first the linear motion guides 114 (slides 114b) are turned into locked state, while the linear motion guide 115 (slide 115b) is turned into movable state. Next, as shown in FIG. 15, the arm unit 1a is moved in the Y direction with the suction device 116 in contact with (fixed to) a table 117 so as to move the slide 115b of the linear motion guide 115 and adjust the holding position (sucking position) of the suction device 116 relative to the workpiece 200. Thus, the holding position of the suction device 116 in the Y direction is adjusted. Likewise, the slide 114b of each linear motion guide 114 is turned into movable state, while the linear motion guide 115 is turned into locked state. Then, the arm unit 1a is moved in the X direction so as to adjust the holding position of the suction device 116 in the X direction.

The second embodiment provides similar advantageous effects to those of the first embodiment.

In the first and second embodiments, the robot with the robot hand is used to take out a workpiece molded in an injection molding machine. This, however, is not intended as limiting the present invention. Other examples of possible applications include robots with robot hands to hold processed products processed by processors other than injection molding machines, and robots with robot hands to hold workpieces arranged on a palette or the like.

Also in the first and second embodiments, a suction device (utilizing negative air pressure) is used to hold the workpiece. This, however, is not intended as limiting the present invention. For example, magnetic force may be utilized to hold the workpiece, or a chuck may be used to hold the workpiece. When a chuck is used to hold the workpiece, the chuck comes in plural pieces, and holding positions of the plurality of chucks relative to the workpiece are adjusted.

Also in the first and second embodiments, links and linear motion guides are used as examples of the movable portion. This, however, is not intended as limiting the present invention. The movable portion may also be implemented by other mechanisms than links and linear motion guides.

Also in the first and second embodiments, the present invention is applied to a vertically articulated robot. This, however, is not intended as limiting the present invention. Other examples than vertically articulated robots include, but not limited to, single-axis robots, cartesian coordinate robots (2-axis robots and 3-axis robots), and SCARA (Selective Compliance Assembly Robot Arm) robots.

Also in the first embodiment, a single suction device is fixed to the table by suction when the arm unit is moved so as to move the links of the robot hand and adjust the holding position of the robot hand relative to the workpiece. This, however, is not intended as limiting the present invention. For example, two or more suction devices may be fixed to the table by suction when the arm unit is moved so as to move the links of the robot hand and adjust the holding position of the robot hand relative to the workpiece.

Also in the first embodiment, the robot hand is provided with four links (four suction devices). This, however, is not intended as limiting the present invention. For example, the number of the links (suction devices) to be disposed at the robot hand may be one, two, three, five, or more than five.

Also in the first embodiment, the holding positions of the four links (four suction devices) of the robot hand are adjusted sequentially, that is, for one link at a time. This, however, is not intended as limiting the present invention. For example, the holding positions of a plurality of links (suction devices) may be adjusted at a time. In this case, two or more links (suction devices) among the four links (four suction devices) are fixed to the table.

Also in the first embodiment, air pressure is utilized to turn the lock into locked state. This, however, is not intended as limiting the present invention. For example, the lock may be turned into locked state by some other method than by utilizing air pressure.

Obviously, numerous modifications and variations of the present invention are possible in light of the above teachings. It is therefore to be understood that within the scope of the appended claims, the invention may be practiced otherwise than as specifically described herein.

What is claimed as new and desired to be secured by Letters Patent of the United States is:

1. A robot comprising:
   a robot hand comprising a movable portion, the movable portion comprising a link including a plurality of link parts;
   an arm unit to which the robot hand is mounted;
   a controller configured to control the arm unit to move the movable portion of the robot hand so as to adjust a holding position of the robot hand relative to a to-be-held object; and
   a plurality of locks mounted to connections of the plurality of link parts and configured to lock the plurality of link parts, the plurality of locks further configured to release the plurality of link parts out of a locked state when air is injected into the plurality of locks.

2. The robot according to claim 1,
wherein the robot hand comprises at least one holder mounted to the movable portion and configured to hold the to-be-held object, and
wherein the arm unit is configured to move the movable portion of the robot hand with the at least one holder in fixed state so as to adjust a holding position of the robot hand relative to the to-be-held object.

3. The robot according to claim 2,
wherein the at least one holder comprises a plurality of holders, and
wherein the arm unit is configured to move the movable portion of the robot hand with at least one holder among the plurality of holders in fixed state so as to adjust a holding position of the robot hand relative to the to-be-held object.

4. The robot according to claim 3,
wherein the plurality of holders are configured to hold a plurality of resin products coupled to each other by a connecting portion, and
wherein the arm unit is configured to move so as to move the movable portion of the robot hand and adjust holding positions of the plurality of holders relative to the plurality of resin products.

5. The robot according to claim 1, wherein the controller is configured to move the arm unit which in turn moves the movable portion of the robot hand based on holding position information of the to-be-held object with a part of the robot hand in fixed state so as to adjust the holding position of the robot hand relative to the to-be-held object.

6. The robot according to claim 5,
wherein the robot hand comprises at least one holder mounted to the movable portion and configured to hold the to-be-held object, and
wherein the controller is configured to control the at least one holder into fixed state and configured to move the arm unit based on the holding position information of the to-be-held object while keeping the at least one holder in fixed state so as to move the movable portion and adjust a holding position of the at least one holder.

7. The robot according to claim 6,
wherein the at least one holder comprises a plurality of holders, and
wherein the controller is configured to control the movable portion to move while keeping one holder among the plurality of holders in fixed state so as to adjust a holding position of the one holder, and configured to sequentially perform this control with respect to remaining holders, one holder at a time, among the plurality of holders.

8. The robot according to claim 1,
wherein the arm unit is configured to move so as to move the link and adjust the holding position of the robot hand relative to the to-be-held object.

9. The robot according to claim 8,
wherein the robot hand comprises a base to which the link is mounted and which is mounted to the arm unit, and
wherein the link comprises
a first link and a second link each disposed on a first side of the base and each comprising a distal end to which a holder configured to hold the to-be-held object is mounted, and
a third link and a fourth link each disposed on a second side of the base and each comprising a distal end to which a holder configured to hold the to-be-held object is mounted.

10. The robot according to claim 1,
wherein the plurality of locks are configured to release the movable portion out of locked state so as to permit the movable portion to move and adjust the holding position of the robot hand relative to the to-be-held object.

11. A robot hand mountable to a robot, the robot hand comprising:
a base mountable to the robot;
a movable portion supported by the base, the movable portion comprising a link including a plurality of link parts;
a holder disposed on the movable portion and configured to hold an object; and
a plurality of locks mounted to connections of the plurality of link parts and configured to lock the plurality of link parts so as to fix the movable portion and further configured to release the movable portion out of fixed state, the plurality of locks being configured to, at a command from a control device, release at least a part of the movable portion out of fixed state while the holder is in a holding operation so as to permit the part of the movable portion to move by movement of the robot and to change a form of the part of the movable portion, the plurality of locks then being configured to fix the released part of the movable portion, the locks further configured to release the plurality of link parts out of a locked state when air is injected into the plurality of locks.

12. A method for adjusting a holding position of a robot hand with a movable portion including a link including a plurality of link parts, the method comprising:
fixing a holder mounted to the movable portion of the robot hand;
injecting air into a lock of a plurality of locks mounted to connections of the plurality of link parts to release a corresponding link part of the plurality of link parts out of a locked state;
moving an arm unit to which the robot hand is mounted to move the movable portion of the robot hand with the holder of the robot hand in fixed state so as to adjust a holding position of the robot hand relative to a to-be-held object.

13. The robot according to claim 2, wherein the controller is configured to move the arm unit based on holding position information of the to-be-held object with a part of the robot hand in fixed state so as to move the movable portion and adjust the holding position of the robot hand relative to the to-be-held object.

14. The robot according to claim 3, wherein the controller is configured to move the arm unit based on holding position information of the to-be-held object with a part of the robot hand in fixed state so as to move the movable portion and adjust the holding position of the robot hand relative to the to-be-held object.

15. The robot according to claim 4, wherein the controller is configured to move the arm unit based on holding position information of the to-be-held object with a part of the robot hand in fixed state so as to move the movable portion and adjust the holding position of the robot hand relative to the to-be-held object.

16. The robot according to claim 2,
wherein the arm unit is configured to move so as to move the link and adjust the holding position of the robot hand relative to the to-be-held object.

17. The robot according to claim 3,
wherein the arm unit is configured to move so as to move the link and adjust the holding position of the robot hand relative to the to-be-held object.

18. The robot according to claim 4,
wherein the arm unit is configured to move so as to move the link and adjust the holding position of the robot hand relative to the to-be-held object.

19. The robot according to claim 5,
wherein the arm unit is configured to move so as to move the link and adjust the holding position of the robot hand relative to the to-be-held object.

20. The robot according to claim 6,
wherein the arm unit is configured to move so as to move the link and adjust the holding position of the robot hand relative to the to-be-held object.

\* \* \* \* \*